(12) United States Patent
Lo et al.

(10) Patent No.: US 9,490,664 B2
(45) Date of Patent: Nov. 8, 2016

(54) AC POWER STRIP DEVICE HAVING INTERCHANGEABLE CONTROL MODULES

(71) Applicant: Kimberlitian Foundation Limited, Tsuen Wan (HK)

(72) Inventors: Hoi Bor Lo, N.T. (HK); Chi Ming Yuen, Kowloon (HK)

(73) Assignee: Kimberlitian Foundation Limited, Hong Kong (HK)

( * ) Notice: Subject to any disclaimer, the term of this patent is extended or adjusted under 35 U.S.C. 154(b) by 508 days.

(21) Appl. No.: 13/729,637

(22) Filed: Dec. 28, 2012

(65) Prior Publication Data

US 2013/0169049 A1 Jul. 4, 2013

Related U.S. Application Data (60) Provisional application No. 61/582,346, filed on Dec. 31, 2011.

(51) Int. Cl.
*H02J 3/14* (2006.01)
*H02J 13/00* (2006.01)
(Continued)

(52) U.S. Cl.
CPC .............. *H02J 13/00* (2013.01); *H01R 13/514* (2013.01); *H01R 13/703* (2013.01); *H01R 25/003* (2013.01); *H01R 13/665* (2013.01); *Y10T 307/469* (2015.04)

(58) Field of Classification Search
CPC . H01R 25/003; H01R 13/514; H01R 13/703
USPC ......... 307/11, 31, 38–39, 115–116; 439/501, 439/535, 652
See application file for complete search history.

(56) References Cited

U.S. PATENT DOCUMENTS

| 6,097,111 A * | 8/2000 | Anrod .................... H01R 13/70 307/115 |
| 6,211,581 B1 * | 4/2001 | Farrant ................... G06F 1/266 307/115 |

(Continued)

FOREIGN PATENT DOCUMENTS

| CN | 201590547 U | 9/2010 |
| CN | 201829752 U | 11/2011 |
| EP | 2290759 A1 | 2/2011 |

OTHER PUBLICATIONS

International Search Report and Written Opinion in associated application PCT/IB2012/003044, mailed Jul. 4, 2013. 10 pages.

*Primary Examiner* — Rexford Barnie
*Assistant Examiner* — Rasem Mourad
(74) *Attorney, Agent, or Firm* — McDermott Will & Emery LLP (57) ABSTRACT

A power strip assembly may include a power strip having a housing that includes multiple sockets for receiving power plugs and that includes a connection interface. Multiple control modules are interchangeably attached to the connection interface, each configured to control a different function or functions with respect to the sockets. One such function may include providing timing for a period of time for which power is supplied to a socket. Another function may include to meter or record power consumed by respective sockets, or to provide remote control capability of the sockets. Multiple switches may be connected with respective sockets that determine whether the power strip or a connected control module controls a function with respect to the respective sockets. A control actuator may be connected with each switch, that when actuated, forces control to pass from the main power source to the control module.

13 Claims, 7 Drawing Sheets

(51) Int. Cl.
*H01R 25/00* (2006.01)
*H01R 13/514* (2006.01)
*H01R 13/703* (2006.01)
*H01R 13/66* (2006.01)

(56) References Cited

U.S. PATENT DOCUMENTS

| | | | | |
|---|---|---|---|---|
| 6,666,712 | B1* | 12/2003 | Kramer | G06F 1/266 439/501 |
| 7,663,866 | B2* | 2/2010 | Lee | H01R 13/652 307/117 |
| 8,212,394 | B2* | 7/2012 | Lee | H02J 3/14 307/38 |
| 2009/0146494 | A1* | 6/2009 | Mori et al. | 307/38 |
| 2009/0207034 | A1* | 8/2009 | Tinaphong | H02H 9/042 340/635 |
| 2009/0215319 | A1* | 8/2009 | Gandhi | H01R 13/7038 439/654 |
| 2010/0317204 | A1* | 12/2010 | Ryan | H01R 13/6397 439/133 |
| 2011/0267729 | A1* | 11/2011 | Yeo | G01R 19/25 361/87 |
| 2012/0019207 | A1* | 1/2012 | Kuo | H01R 25/003 320/111 |

\* cited by examiner

AC POWER STRIP DEVICE HAVING INTERCHANGEABLE CONTROL MODULES

TECHNICAL FIELD

This disclosure relates to alternating current (AC) power strips. In particular, this disclosure relates to an AC power strip that includes a housing and connectable and interchangeable control modules that control functions with respect to sockets of the power strip.

BACKGROUND

Electrical power strips are commonly used to supply power to multiple peripheral electrically-operated devices. Conventional AC electrical power strips provide a user with a greater number of electrical sockets than the average electrical wall outlet. A main switch on electrical power strips is used to turn the power on or off to all of the electrical sockets. The main switch does not allow the user to control the power to each individual socket, and the user must physically reach for the main switch to turn the power on or off. The user may only control the power to each individual peripheral electrically-operated device by physically inserting or removing the power plug of the electrical device from an electrical socket.

BRIEF DESCRIPTION OF THE DRAWINGS

The systems and methods may be better understood with reference to the following drawings and description. In the figures, like reference numerals designate corresponding parts throughout the different views.

DETAILED DESCRIPTION

The discussion below refers to a power strip assembly, including a power strip having a housing including multiple sockets for receiving power plugs and having a connection interface. A first control module may be releasably connectable to the connection interface of the housing, the first control module configured to control a first function with respect to the sockets. A second control module may be releasably connectable to the connection interface of the housing, the second control module configured to control a second function with respect to the sockets, the second control module interchangeable with the first control module.

The housing may further include multiple switches each connected with a socket, the switches configured to switch function control with respect to the sockets between the power strip and the first and second control modules. The housing may also include multiple control actuators connected with respective switches, the control actuators configured to, when activated, force the switches off and provide control with respect to the sockets to the connected first or second control module.

The housing or main component of the power strip assembly may further include a female connector having an internal block with opposing guide grooves and a ledge within each groove. A connectable control module may include a male connector for corresponding attachment with the female connector of the housing, the male connector having a connection interface including hooks configured to slide within the grooves and clamp onto the ledges, to connect the control module to the housing. The connection interface of the control module may further include a pair of opposing tabs connected to respective hooks, the tabs releasably engageable to disengage the hooks to disconnect the control module from the housing.

The control module may further include control circuitry to control a function with respect to the multiple sockets, and where the internal block includes a Universal Serial Bus (USB) receptacle connected with the multiple switches, and the connection interface includes a USB connector connectable to the USB receptacle, to provide connection between the control circuitry and the multiple switches.

A method of powering at least one appliance through the power strip assembly may include connecting a first control module to the housing and controlling a first function with respect to the sockets with first control circuitry of the first control module when the switches are at a first position. The method may further include removing the first control module from the power strip and connecting a second control module to the housing of the power strip, the second control module interchangeable with the first control module. The method may further include controlling a second function with respect to the power strip with second control circuitry of the second control module when the switches are at the first position.

Figure 1:
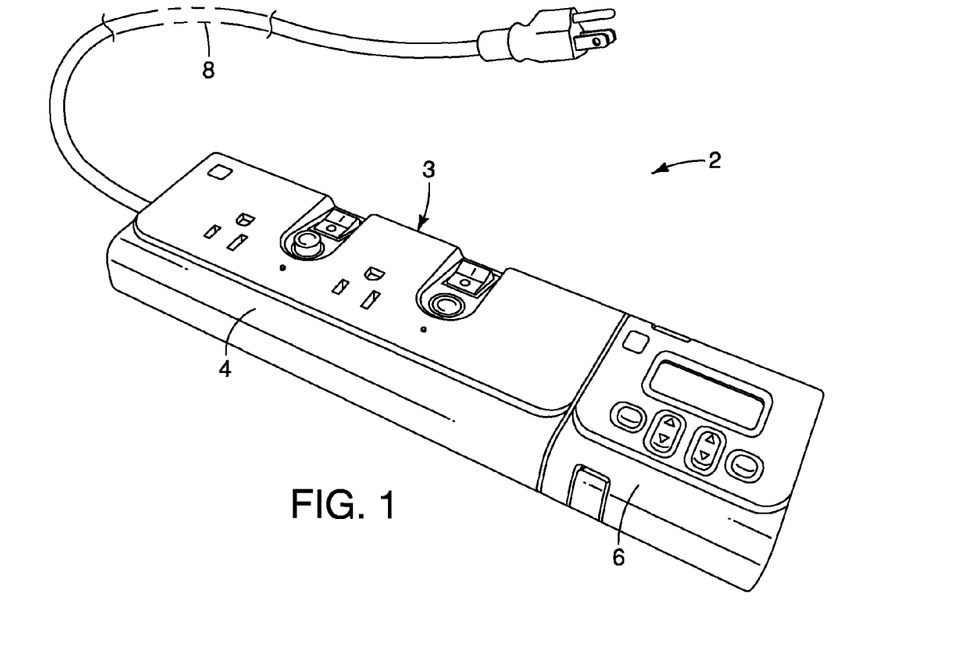
FIG. 1 is a perspective view of a power strip assembly that includes a power strip having a housing and an attached control module.

FIG. 1 is a perspective view of a power strip assembly 2 that includes a power strip 3 having a housing 4 and an attached control module 6. Each of the power strip 3 and the control module 6 may be generally rectangular with rounded edges. The control module 6 is connectable to and removable from the housing 4 of the power strip 3. The power strip assembly 2 may further include a power cord (or cable) 8 or other connection means for connecting the power strip assembly 2 to an electrical supply or other main power source. In other embodiments, the power cord 8 may be a power plug integrated into the housing 4 for mounting the power strip device 2 to a wall. The electrical supply may include an electrical wall outlet, a power extension cord including electrical sockets, or an alternate electrical socket for supplying electricity to the power strip assembly 2.

Figure 2:
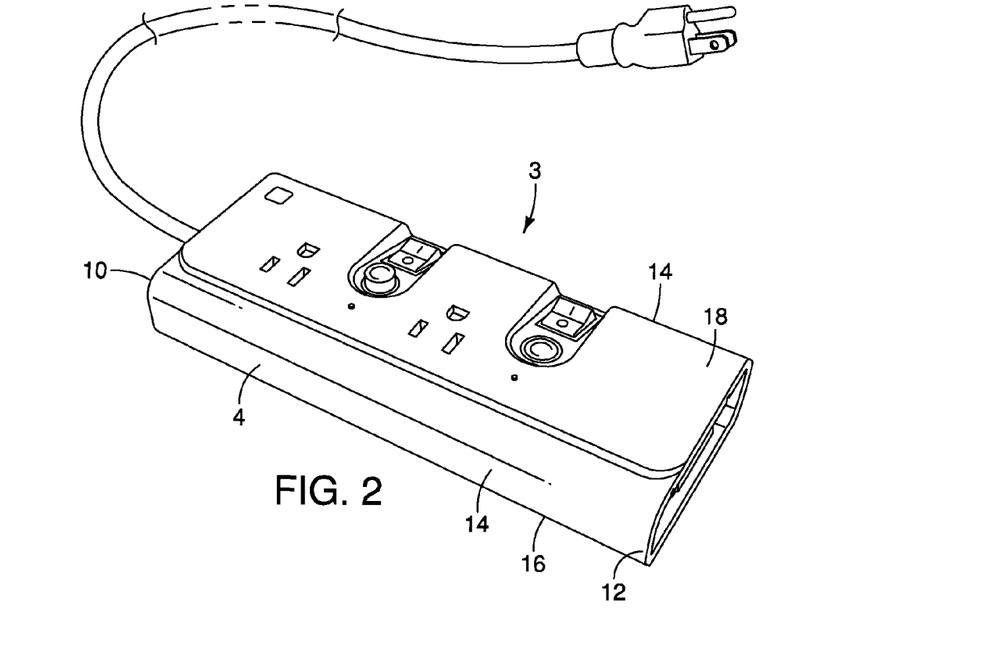
FIG. 2 is a perspective view of the housing of the power strip of FIG. 1.
Figure 3:
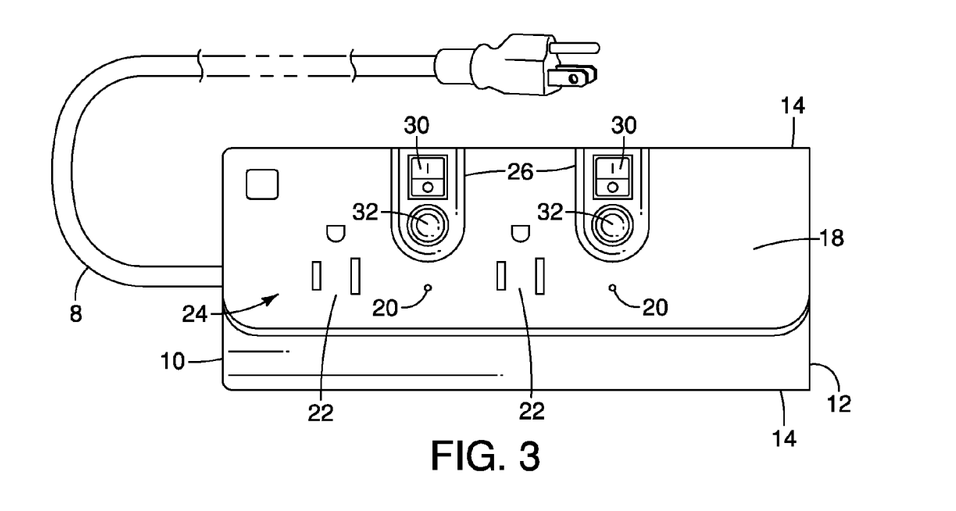
FIG. 3 is a top view of the housing of FIG. 1.
Figure 4:
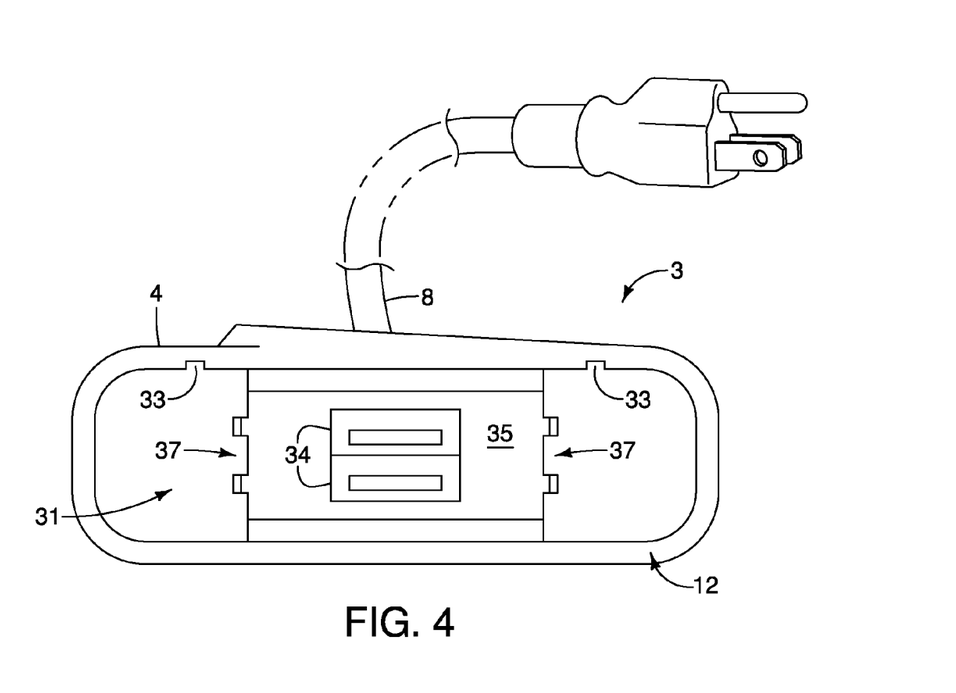
FIG. 4 is an end view of the housing of FIGS. 1 and 3.

FIG. 2 is a perspective view of the housing 4 of the power strip 3 of FIG. 1. FIG. 3 is a top view of the housing of FIG. 1. FIG. 4 is an end view of the housing of FIG. 1. The housing 4 may include a first end 10, a second end 12, at least a pair of elongated sidewalls 14, a bottom face 16, and a socket face 18. The housing 4 and/or the control module 6 may be composed of any suitable material, including plastic, metallic, non-metallic, or metallic/non-metallic composites.

The socket face 18 may include multiple sockets 22 for receiving power plugs from peripheral electronically-operated devices. The sockets 22 may be positioned along the length of the socket face 18 and parallel to the elongated sidewalls 14. The length of the socket face 18 and the elongated sidewalls 14 may vary to allow for less or more than two sockets 22. In a first embodiment, the sockets 22 may include one row 24 of sockets 22. In other embodiments, the sockets 22 may include multiple rows 24 of sockets 22. The width of the socket face 18 and the lengths of the first end 10 and second end 12 may vary to allow for one or more rows 24 of sockets 22. The housing 4 may further include multiple indicator lights 28 that signal whether power is being supplied to respective sockets 22.

Figure 10:
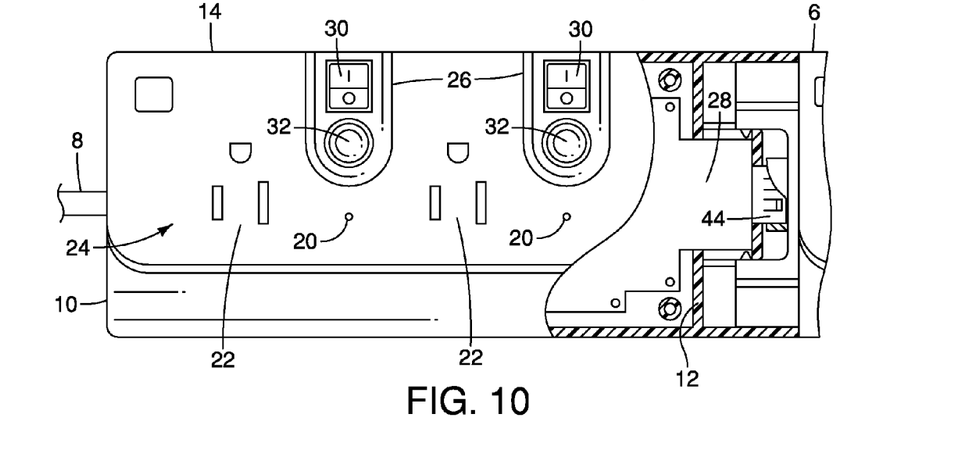
FIG. 10 is a cross-sectional view of the housing of the power strip of FIG. 1.

FIG. 10 is a cross-sectional view of the housing 4 of the power strip assembly of FIG. 1. The housing 4 may further include primary circuitry 28 for controlling power to the power strip assembly 2 and for controlling power supplied to respective sockets 22. The primary circuitry 28 may also control other functions with respect to the sockets 22. The primary circuitry 28 may include a circuit breaker or the like for preventing damage caused by excessive current from the electrical supply or a main power source to which is connected the power cord 8. The primary circuitry 28 may further include surge protection for preventing voltage spikes in voltage supplied to peripheral, electronically-operated devices connected to the housing 4.

Power to the sockets 22 may be controlled via the primary circuitry 28 or the control module 6. The socket face 18 may further include multiple switches 26 connected with each socket 22. The switches 26 may provide a means for controlling functioning of each socket 22 between the primary circuitry 28 and the control module 6. In other embodiments, the socket face 18 may further include a main power switch for disconnecting power from the power strip assembly 2 completely and for restoring power to the power strip assembly from a power supply through the power cord 8. When either the primary circuitry 28 or the control module 6 controls the functioning of the sockets 22, the main switch may provide a means to terminate the power supplied to all of the sockets 22.

Figure 11A:
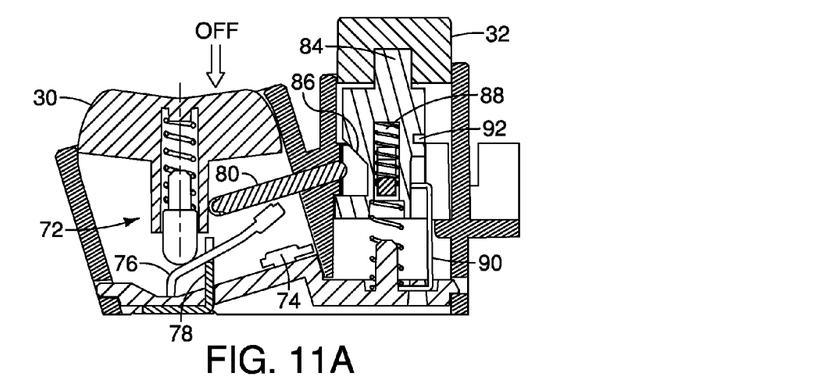
FIGS. 11A, 11B and 11C are cross-section views showing steps in functioning of a rocker switch and connected actuator of the housing of FIGS. 1-4.
Figure 11B:
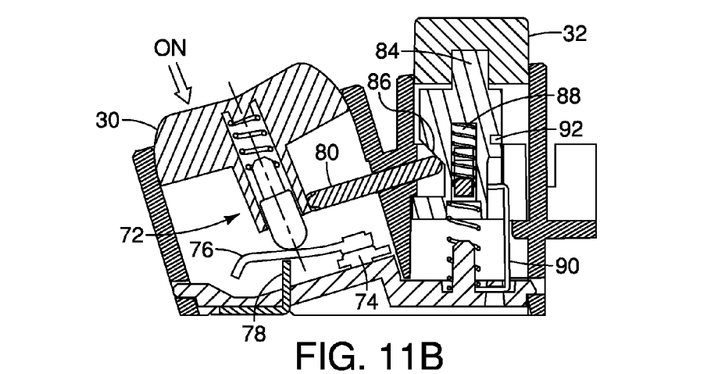
Figure 11C:
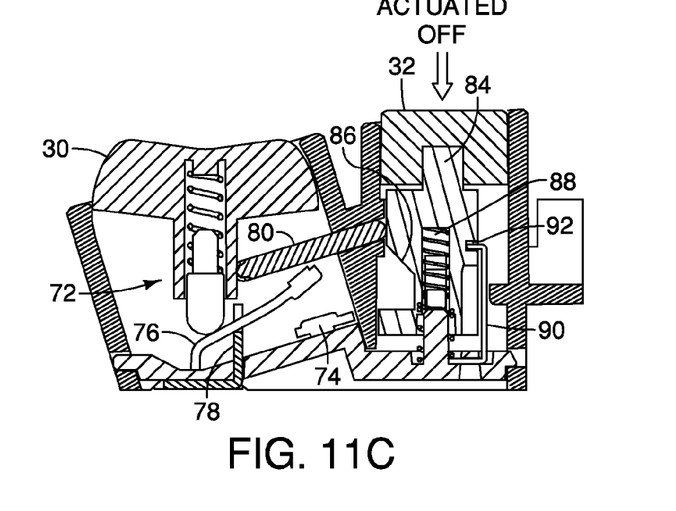

With additional reference to FIGS. 11A, 11B and 11C, each switch 26 may include a main component 30 and a control component 32 where the control component may also be referred to as an actuator 32. The main component 30 may be a rocker switch 30 for turning power on or off to a corresponding socket 22 from the power supply provided through the power cord 8. The rocker switch 30 may further shift control of the power supply between the primary circuitry 28 and the control module 6. For example, when the rocker switch 30 is positioned in a specific position (such as "OFF"), the control with respect to a corresponding socket 22 may be given to the control module 6. Control with respect to a corresponding socket may include controlling whether power is supplied to the socket 22.

Control with respect to a socket may further include one or a combination of: controlling a period of time during which power connected to a socket; remotely controlling an appliance connected to a socket; sensing light for an appliance connected to a socket; sensing sound for an appliance connected to a socket; metering power consumed by an appliance connected to a socket; and adjusting a level of light of a lamp connected to a power socket.

The actuator 32 may include a button or electrical component for engaging the control module 6. When the actuator 32 is engaged, the control module 6 may control functioning with respect to one or more of the sockets 22. Accordingly, engaging the actuator 32 corresponding to a socket 22 forces the switch 30 to the OFF position if previously in the "ON" position. Engagement of the actuator 30 and disengagement of the actuator 32, if previously engaged, permits controlling the functioning of a socket 22 via the primary circuitry 28.

More specifically, the rocker switch 30 may further include a spring-loaded bobbin 72, a contact 74, a contact arm 76, a focal plate 78 and an actutator rod 80. The actuator 32 may further include a slotted block 84 having a slanted surface 86, a spring 88 and a position arm 90. When the rocker switch 30 is pressed to the left (towards the edge of the housing 4), the rocker switch 30 is turned "ON" (FIG. 11B) by pushing the spring-loaded bobbin 72 against the contact arm 76, which rotates about the focal plate 78 and contacts the contact 74, thus providing power to the socket and control to the control circuitry 28. The rocker switch 30 may similarly be turned OFF (FIG. 11A) by rocking the switch 30 to the right, causing the spring-loaded bobbin 72 to release the contact arm 76 from the contact 74 and to push the contact arm back over the focal plate 78 to keep the contact arm from contacting the contact 74.

A user, however, may also press the actuator 32 (FIG. 11C) to force the rocker switch 30 not only back to the OFF position, but force control with respect to the corresponding socket to pass to the control module 6 until the actuator switch 30 is again turned ON. When the actuator 32 is pressed, the slotted block 84 compresses the spring 88, causing the slanted surface 86 to be biased against the actuator rod 80, which forces the spring-loaded bobbin 72 into the OFF position. At the same time, the position arm 90 locks into a small slot 92 to hold the actuator 32 down until such time that a user turns the rocker switch 30 back on.

Figure 8:
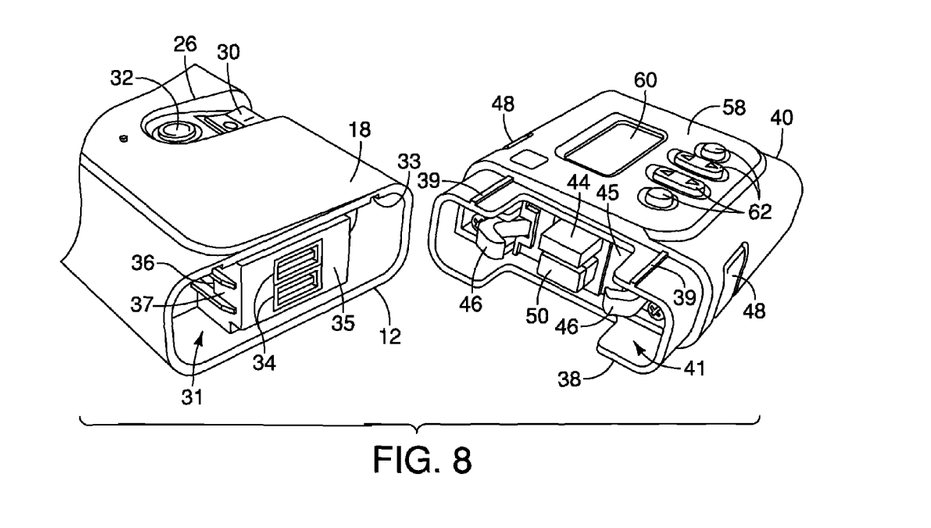
FIG. 8 is a perspective view of the housing of FIG. 1 detached from the control module of FIG. 1, showing respective connection interfaces.

FIGS. 4 and 8 illustrate the second end 12 of the housing 4. The second end 12 may include a first connection interface 31 that may include one or more Universal Bus Connection (USB) receptacles 34 for receiving USB connections from peripheral electrically operated devices. The power strip assembly 2 may supply power to an electrical device connected to the housing 4 via a USB receptacle 34 for charging the electrical device.

One of the USB receptacles 34 may provide a connection means for attaching the control module 6 to the housing 4. In other embodiments, the connection means may include pin plugs or other connection means for providing a rigid connection between the housing 4 and the control module 6 that forms an electrically-interconnected and physically-integrated power strip device.

The first connection interface 31 may be a female connector defining first groves 33 on an inside portion of the female connector. The first connection interface 31 may further include an internal block 35 defining a ledge 36 on either side of the block 35 and opposing second groves 37 at least as far back as each respective ledge 36. The USB receptacle(s) 34 may be connected to the internal block.

Figure 5:
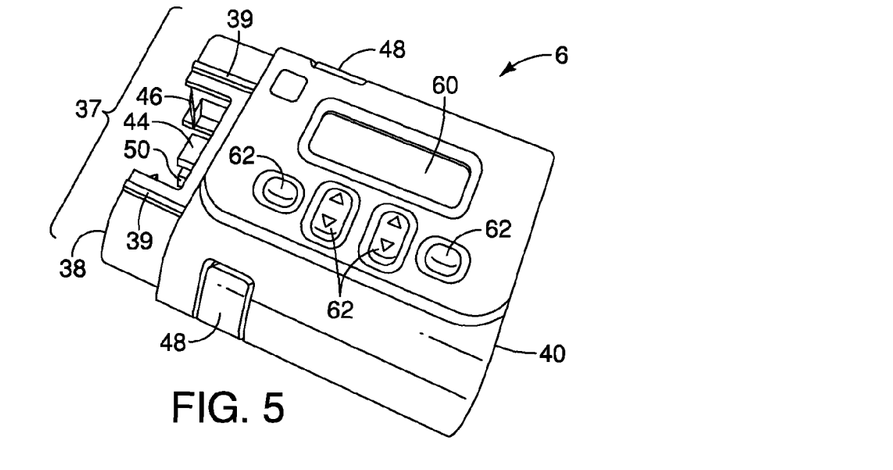
FIG. 5 is a perspective view of the control module of FIG. 1.
Figure 6:
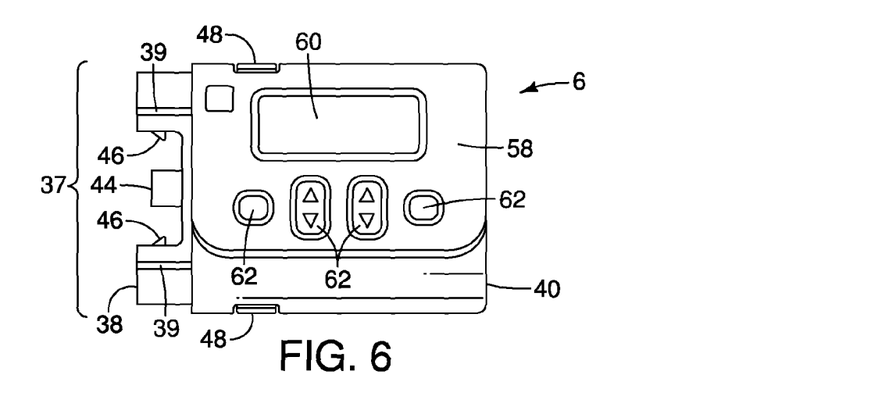
FIG. 6 is a top view of the control module of FIG. 1.
Figure 7:
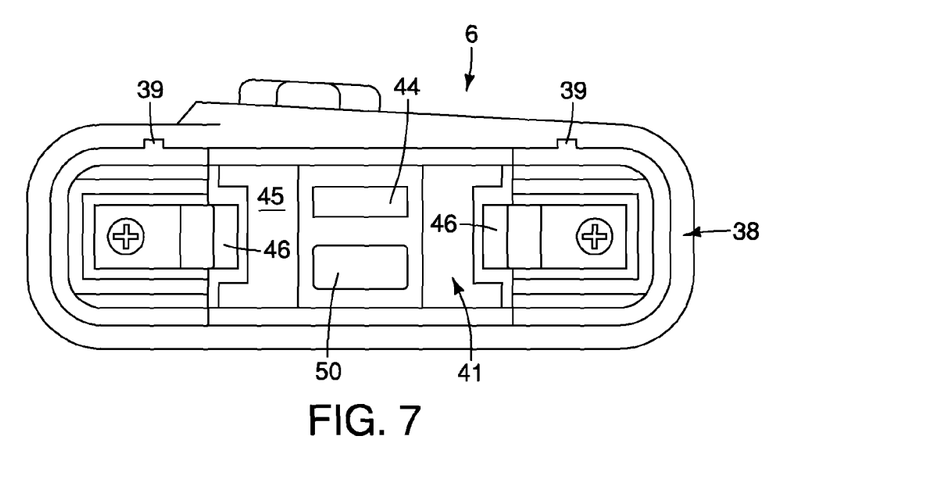
FIG. 7 is a side view of the control module of FIG. 1.
Figure 9:
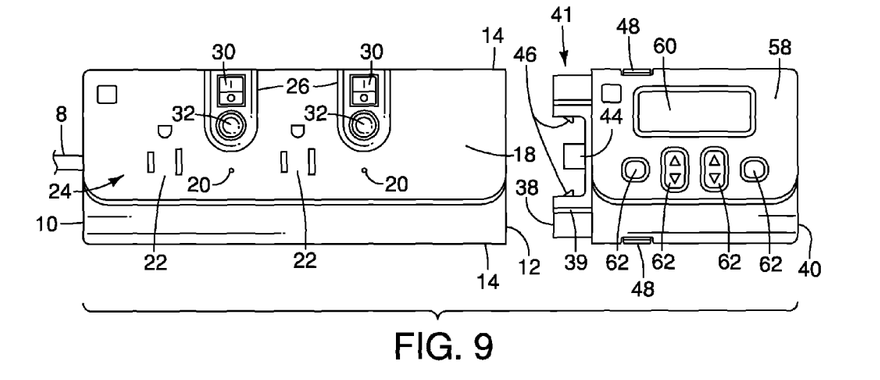
FIG. 9 is a top view of the housing of FIG. 8 detached from the control module of FIG. 8.

FIG. 5 is a perspective view of the control module 6 of FIG. 1. FIG. 6 is a top view of the control module 6 of FIG. 1. FIG. 7 is a side view of the control module 6 of FIG. 1. FIG. 8 is a perspective view of the housing of FIG. 1 detached from the control module of FIG. 1, showing respective connection interfaces 31 and 41 of the housing and the control module. FIG. 9 is a top view of the housing 4 of FIG. 8 detached from the control module 6 of FIG. 8. The control module 6 may include a first end 38, a second end 40 and control circuitry.

The first end 38 may include a second connection interface 41 that may be a male connector with corresponding connection to the female connector of the first connection interface 31. For example, the male connector may include linear raised portions 39 that slide inside of the first groves 33 of the first connection interface 31. The second connection interface 41 may further include an interface wall 45 to which a USB connector 44 is attached that connects into one of the USB receptacles 34 of the first connection interface 31. The USB receptacle may provide connection between the control circuitry 28 of the control module and the switches 30 of the power strip 2. In other embodiments, the electrical connection means between the power strip and the control module may include pin plugs or the like.

Figure 12A:
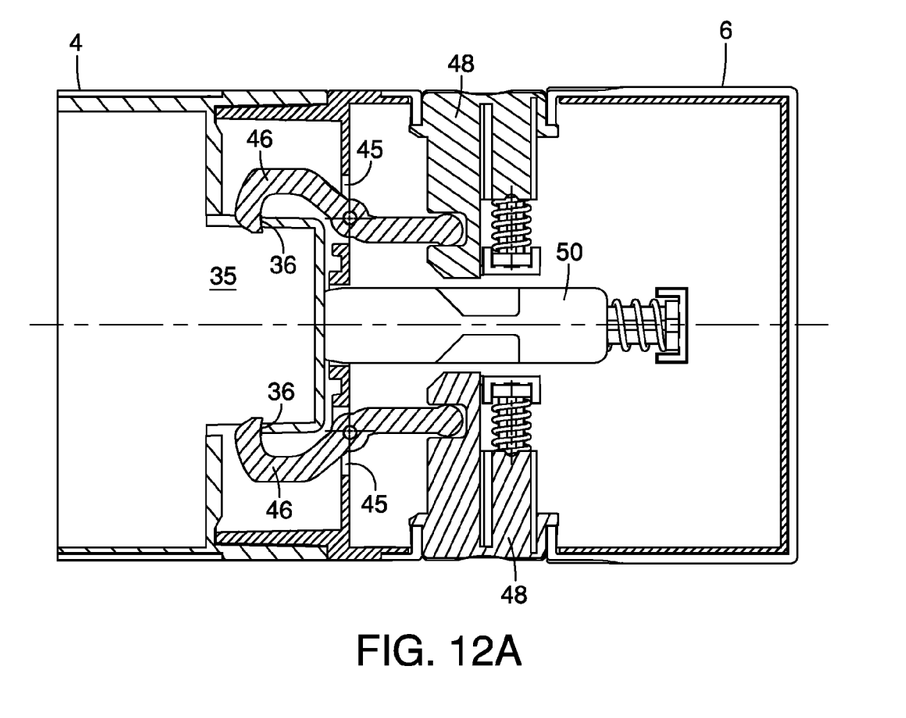
FIGS. 12A, 12B and 12C are cross-section views of the spring-loaded plunger of the control module of FIGS. 1 and 5-9.
Figure 12B:
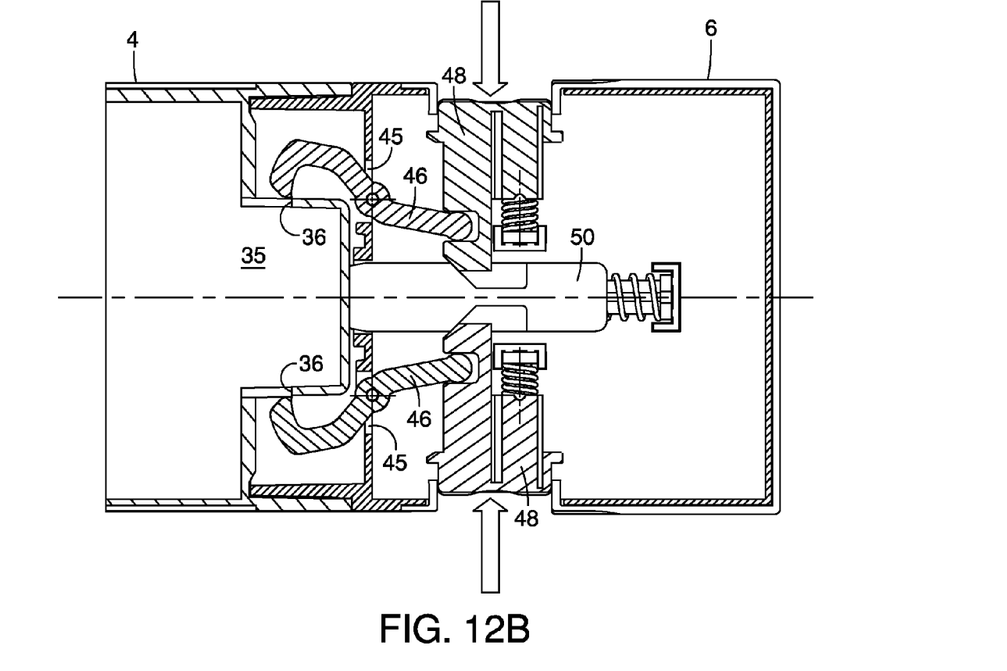
Figure 12C:
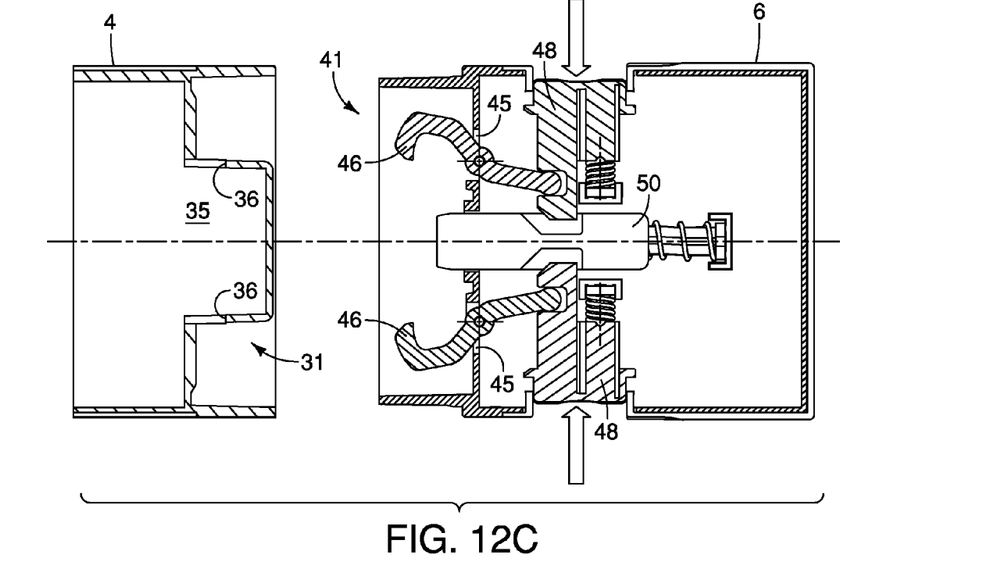

With additional reference to FIGS. 12A, 12B and 12C, a pair of flexible hooks 46 may also be connected to the interface wall 45 that slide within the second groves 37 and hook onto the ledges 36, to thus lock in place the control module 6 once connected to the housing 4. The control module 6 may further include a pair of spring-loaded tabs 48 connected with respective hooks 46 that when engaged, disengage the hooks 46 from the ledges 36 of the first block 35 to disconnect the control module 6 from the housing 4 of the power strip 3. A spring loaded plunger 50 may also be attached to the face of the second block 45 that provides a biased force that pushes the control module away from the housing and thus facilitate disconnection of the two when the tabs 48 are engaged. The plunger 50 may also or additionally be attached to the first block in another embodiment.

The interconnection of the first and second connection interfaces 31 and 41 may provide an integrated, rigid power strip device of the connected power strip 3 and control module 6 portions of the power strip assembly 2. Additional securing means may be provided such as through use of electromagnetism to provide the interconnection.

The control module 6 may further include a display face 58 having a digital display 60 and controls 62 for inputting settings for the control with respect to functioning of the sockets 22. The control module 6 may be made of any suitable material, including plastic, metallic, non-metallic, or metallic/non-metallic composites. Circuitry of digital electronic circuits including logic gates, such as an integrated circuit, may be provided within each control module configured to execute a specific control function. The circuitry may change from control module to control module or the circuitry may be programmed with different control functions.

In one embodiment, first and second control modules may be interchangeable as connected to the housing of a power strip and yet provide different control functions with respect to the sockets and/or with respect to the power strip. A first control module may include a device capable of performing a first control function for controlling functioning of the sockets. A second control module may include a different device capable of performing a second, different control function for controlling functioning with respect to the sockets or with respect to the power strip more generally.

For example, the first control module may be a timer to control power supplied to one or more sockets for a determined period of time, after which the power may be disconnected from the socket(s). The first control module and/or the second control module may be something other than a timer, for example: a remote controller, a light sensor, a sound sensor, a power meter, a wireless controller, a network controller, a dimmer, or a power consumption recorder.

The remote controller may be configured to remotely control an appliance connected to a socket. The light sensor may be configured to sense light for an appliance connected to a socket, such as an amount of light in the environment or room in which the appliance is located. The light sensor may also adjust a level of light of a lamp or other light connected to the power socket. The sound sensor may sense sound for an appliance connected to a socket. The power meter may meter power consumed by an appliance connected to a socket.

When one of the control modules includes a wireless controller or a network controller, a user may operate the control module with a remote control connection or other network control means, including a computer, through which the user may control the functioning of the sockets remotely.

When one of the control modules includes a power meter or a power consumption recorder, the housing and the control module may further include cores for enabling electromagnetic induction. Cores include metallic material. The control module may further include an electromagnetic coil positioned around the core to form an inductor. The electromagnetic coil may include a conducting material including copper or aluminum. When the control module so configured is engaged, the cores create a closed loop electrical path. The power meter or power consumption recorder may then measure the current across the electromagnetic coil for calculating and controlling the power supplied to each socket.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A power strip assembly, comprising: a power strip having a primary function and a housing including multiple sockets for receiving power plugs, the housing also including a connection interface, the connection interface including at least one Universal Serial Bus (USB) receptacle; a first control module, including a USB connector and a digital display, that is releasably connectable to the connection interface of the housing, the first control module configured to control a first function with respect to the sockets; and a second control module, including a USB connector, that is releasably connectable to the connection interface of the housing, the second control module configured to control a second function with respect to the sockets, the second control module interchangeable with the first control module, wherein the first and second control modules are selected from the group consisting of a timer, a remote controller, a light sensor, a sound sensor, a power meter, a wireless controller, a network controller, a dimmer and a power consumption recorder; and where the first and second control modules are different from each other.

2. The power strip of claim 1, where the housing further comprises multiple switches each connected with a socket, the switches configured to switch function control with respect to the sockets between the primary function of the power strip and the first and second control modules.

3. The power strip of claim 2, further comprising multiple control actuators connected with respective switches, the control actuators configured to, when activated, force the switches off and provide control with respect to the sockets to the connected first or second control module.

4. The power strip of claim 1, wherein the first control function controls how long power is supplied to a socket.

5. The power strip of claim 1, wherein the second control function is different than the first control function.

6. The power strip of claim 1, where the housing and the first control module form an integrated, rigid structure when connected.

7. The power strip of claim 1, where the housing and the second control module form an integrated, rigid structure when connected.

8. A method of powering at least one appliance through a power strip, comprising:
   connecting a first control module having at least one USB connector and at least one spring-loaded tab to a housing of the power strip that includes multiple sockets for reception of power plugs, the housing also including multiple switches each connected with a socket and with a main power source and at least one USB receptacle;
   controlling a first function with respect to the sockets with first control circuitry of the first control module when the switches are at a first position;
   removing the first control module from the power strip;
   connecting a second control module having at least one USB connector to the housing of the power strip, the second control module interchangeable with the first control module; and
   controlling a second function with respect to the power strip with second control circuitry of the second control module when the switches are at the first position,
   and wherein the first and second functions are selected from the group consisting of:
   controlling a period of time during which power is supplied to a socket, remotely controlling an appliance connected to a socket, sensing light for an appliance connected to a socket, sensing sound for an appliance connected to a socket, metering power consumed by an appliance connected to a socket, and adjusting a level of light of a lamp connected to a power socket.

9. The method of claim 8, where the first position of the switches comprises an off position, the method further comprising: turning on one of the switches to control the first or second function of a corresponding socket with the power strip.

10. The method of claim 8, where the first control function is different than the second control function.

11. The method of claim 10, where one of the first and second control modules comprises a network control unit, further comprising:
   controlling, over a network, the network control unit to remotely control the first or the second control function.

12. The method of claim 8, where the first position of the switches comprises an off position, the method further comprising actuating a control actuator to turn off a switch connected with the control actuator.

13. A power strip assembly, comprising:
   a power strip having a primary function and a housing including multiple sockets for receiving power plugs, the housing also including a connection interface, the connection interface including at least one Universal Serial Bus (USB) receptacle;
   a first control module including a USB connector and a digital display that is releasably connectable to the connection interface of the housing, the first control module configured to control a first function with respect to the sockets; and
   a second control module including a USB connector that is releasably connectable to the connection interface of the housing, the second control module configured to control a second function with respect to the sockets, the second control module interchangeable with the first control module,
   wherein the first and second control modules are selected from the group consisting of a light sensor, a sound sensor, a power meter, a network controller, a dimmer and a power consumption recorder, and wherein the first and second control modules are different from each other.

* * * * *